United States Patent
Han et al.

(10) Patent No.: US 10,277,905 B2
(45) Date of Patent: Apr. 30, 2019

(54) TRANSFORM SELECTION FOR NON-BASEBAND SIGNAL CODING

(71) Applicant: Google LLC, Mountain View, CA (US)

(72) Inventors: Jingning Han, Santa Clara, CA (US); Yaowu Xu, Saratoga, CA (US); Cheng Chen, Coralville, IA (US)

(73) Assignee: GOOGLE LLC, Mountain View, CA (US)

( * ) Notice: Subject to any disclaimer, the term of this patent is extended or adjusted under 35 U.S.C. 154(b) by 450 days.

(21) Appl. No.: 14/853,215

(22) Filed: Sep. 14, 2015

(65) Prior Publication Data
US 2017/0078672 A1     Mar. 16, 2017

(51) Int. Cl.
*H04N 7/12*       (2006.01)
*H04N 11/02*     (2006.01)
(Continued)

(52) U.S. Cl.
CPC ......... *H04N 19/159* (2014.11); *H04N 19/112* (2014.11); *H04N 19/124* (2014.11);
(Continued)

(58) Field of Classification Search
CPC .. H04N 13/125; H04N 19/159; H04N 19/112; H04N 19/147; H04N 19/60;
(Continued)

(56) References Cited

U.S. PATENT DOCUMENTS 4,774,574 A    9/1988  Daly et al.
5,068,724 A    11/1991 Krause et al.
(Continued)

FOREIGN PATENT DOCUMENTS

JP    2010199959 A    9/2010
WO    97/15146 A1     4/1997
(Continued)

OTHER PUBLICATIONS

Chen J. et al., "TE:Simulation results for various max. number of transform quadtree depth," MPEG Meeting, Guangzhou, Chima; No. M18236; Oct. 28, 2010.
(Continued)

*Primary Examiner* — Jorge L Ortiz Criado
*Assistant Examiner* — Susan E. Hodges
(74) *Attorney, Agent, or Firm* — Young Basile Hanlon & MacFarlane, P.C.

(57) ABSTRACT

Blocks of a frame of a non-baseband video signal are encoded by selecting between a staircase- or sinusoidal-based transform. For each prediction mode, a prediction block for encoding a current block is generated, a residual block is generated, the residual block is transformed using a sinusoidal-based transform and using a staircase-based transform, and first and second rate-distortion value for encoding the residual block using the sinusoidal-based transform and staircase-based transform are respectively generated. One of the staircase-based transform or the sinusoidal-based transform for encoding the residual block is selected based on a lowest value of the first rate-distortion value and the second rate-distortion value among results for each prediction mode, and the current block is encoded using the selected one of the staircase-based transform or the sinusoidal-based transform. Improved appearance for blocks having sharp edges can be achieved and lossless encoding is possible using the staircase-based transform.

13 Claims, 6 Drawing Sheets

(51) Int. Cl.
| | |
|---|---|
| *H04B 1/66* | (2006.01) |
| *H04N 19/159* | (2014.01) |
| *H04N 19/176* | (2014.01) |
| *H04N 19/61* | (2014.01) |
| *H04N 19/89* | (2014.01) |
| *H04N 19/625* | (2014.01) |
| *H04N 19/91* | (2014.01) |
| *H04N 19/593* | (2014.01) |
| *H04N 19/124* | (2014.01) |
| *H04N 19/147* | (2014.01) |
| *H04N 19/60* | (2014.01) |
| *H04N 19/112* | (2014.01) |

(52) U.S. Cl.
CPC ......... *H04N 19/147* (2014.11); *H04N 19/176* (2014.11); *H04N 19/593* (2014.11); *H04N 19/60* (2014.11); *H04N 19/61* (2014.11); *H04N 19/625* (2014.11); *H04N 19/89* (2014.11); *H04N 19/91* (2014.11)

(58) Field of Classification Search
CPC .... H04N 19/593; H04N 19/91; H04N 19/625; H04N 19/89; H04N 19/61; H04N 19/124; H04N 19/176
USPC ........................................................ 375/240
See application file for complete search history.

(56) References Cited

U.S. PATENT DOCUMENTS

| | | |
|---|---|---|
| 5,091,782 A | 2/1992 | Krause et al. |
| 5,121,216 A | 6/1992 | Chen et al. |
| 5,146,324 A | 9/1992 | Miller et al. |
| 5,224,062 A | 6/1993 | McMillan, Jr. et al. |
| 5,235,623 A | 8/1993 | Sugiyama et al. |
| 5,260,782 A | 11/1993 | Hui |
| 5,274,442 A | 12/1993 | Murakami et al. |
| 5,341,440 A | 8/1994 | Earl et al. |
| 5,422,963 A | 6/1995 | Chen et al. |
| 5,444,800 A | 8/1995 | Kim |
| 5,635,938 A | 6/1997 | Komoto |
| 5,737,020 A | 4/1998 | Hall et al. |
| 5,764,805 A | 6/1998 | Martucci et al. |
| 5,767,908 A | 6/1998 | Choi |
| 5,872,866 A | 2/1999 | Strongin et al. |
| 5,903,669 A | 5/1999 | Hirabayashi |
| 6,108,383 A | 8/2000 | Miller et al. |
| 6,115,501 A | 9/2000 | Chun et al. |
| 6,134,350 A | 10/2000 | Beck |
| 6,167,161 A | 12/2000 | Oami |
| 6,408,025 B1 | 6/2002 | Kaup |
| 6,522,783 B1 | 2/2003 | Zeng et al. |
| 6,522,784 B1 | 2/2003 | Zlotnick |
| 6,683,991 B1 | 1/2004 | Andrew et al. |
| 6,819,793 B1 | 11/2004 | Reshetov et al. |
| 6,917,651 B1 | 7/2005 | Yoo et al. |
| 6,934,419 B2 | 8/2005 | Zlotnick |
| 7,266,149 B2 | 9/2007 | Holcomb et al. |
| 7,292,634 B2 | 11/2007 | Yamamoto et al. |
| 7,409,099 B1 | 8/2008 | Ameres et al. |
| 7,492,823 B2 | 2/2009 | Lee et al. |
| 7,894,530 B2 | 2/2011 | Gordon et al. |
| 7,912,318 B2 | 3/2011 | Nakayama |
| 7,936,820 B2 | 5/2011 | Watanabe et al. |
| 8,000,546 B2 | 8/2011 | Yang et al. |
| 8,094,950 B2 | 1/2012 | Sasagawa |
| 8,116,374 B2 | 2/2012 | Gordon et al. |
| 8,494,290 B2 | 7/2013 | Cohen et al. |
| 8,582,656 B2 | 11/2013 | Lin et al. |
| 8,687,699 B1 | 4/2014 | Wen |
| 8,885,701 B2 | 11/2014 | Saxena et al. |
| 9,106,933 B1 | 8/2015 | Bankoski et al. |
| 9,219,915 B1 | 12/2015 | Bultje et al. |
| 2002/0168114 A1 | 11/2002 | Valente |
| 2002/0196983 A1 | 12/2002 | Kobayashi |
| 2003/0048943 A1 | 3/2003 | Ishikawa |
| 2003/0146925 A1 | 8/2003 | Zhao et al. |
| 2004/0057519 A1 | 3/2004 | Yamamoto et al. |
| 2004/0125204 A1* | 7/2004 | Yamada ............... H04N 19/197 348/97 |
| 2004/0184537 A1 | 9/2004 | Geiger et al. |
| 2005/0025246 A1 | 2/2005 | Holcomb |
| 2005/0053151 A1 | 3/2005 | Lin et al. |
| 2005/0147163 A1 | 7/2005 | Li et al. |
| 2005/0249291 A1 | 11/2005 | Gordon et al. |
| 2006/0045368 A1 | 3/2006 | Mehrotra |
| 2006/0098738 A1 | 5/2006 | Cosman et al. |
| 2006/0115168 A1 | 6/2006 | Kobayashi |
| 2006/0133682 A1 | 6/2006 | Tu et al. |
| 2006/0210181 A1 | 9/2006 | Wu et al. |
| 2006/0239575 A1 | 10/2006 | Abe et al. |
| 2006/0251330 A1 | 11/2006 | Toth et al. |
| 2007/0036223 A1 | 2/2007 | Srinivasan |
| 2007/0078661 A1 | 4/2007 | Sriram et al. |
| 2007/0140349 A1* | 6/2007 | Burazerovic .......... H04N 19/61 375/240.18 |
| 2007/0183500 A1 | 8/2007 | Nagaraj et al. |
| 2007/0201554 A1 | 8/2007 | Sihn |
| 2007/0211953 A1 | 9/2007 | Sasagawa |
| 2007/0223583 A1 | 9/2007 | Nagai et al. |
| 2008/0008246 A1 | 1/2008 | Mukherjee et al. |
| 2008/0043848 A1 | 2/2008 | Kuhn |
| 2008/0084929 A1 | 4/2008 | Li |
| 2008/0123736 A1 | 5/2008 | Sekiguchi et al. |
| 2008/0123947 A1 | 5/2008 | Moriya et al. |
| 2008/0123977 A1 | 5/2008 | Moriya et al. |
| 2008/0253463 A1 | 10/2008 | Lin et al. |
| 2008/0310512 A1 | 12/2008 | Ye et al. |
| 2009/0041128 A1 | 2/2009 | Howard |
| 2009/0049641 A1 | 2/2009 | Pullins et al. |
| 2009/0067503 A1 | 3/2009 | Jeong et al. |
| 2009/0122864 A1 | 5/2009 | Palfner et al. |
| 2009/0123066 A1 | 5/2009 | Moriya et al. |
| 2009/0228290 A1 | 9/2009 | Chen et al. |
| 2009/0274382 A1 | 11/2009 | Lin et al. |
| 2010/0020867 A1 | 1/2010 | Wiegand et al. |
| 2010/0086049 A1 | 4/2010 | Ye et al. |
| 2010/0246951 A1 | 9/2010 | Chen et al. |
| 2010/0290520 A1 | 11/2010 | Kamisli et al. |
| 2010/0309286 A1 | 12/2010 | Chen et al. |
| 2011/0032983 A1 | 2/2011 | Sezer |
| 2011/0090959 A1 | 4/2011 | Wiegand et al. |
| 2011/0182352 A1 | 7/2011 | Pace |
| 2011/0206135 A1 | 8/2011 | Drugeon et al. |
| 2011/0243249 A1 | 10/2011 | Lee et al. |
| 2011/0268183 A1 | 11/2011 | Sole et al. |
| 2011/0274162 A1 | 11/2011 | Zhou et al. |
| 2011/0286516 A1 | 11/2011 | Lim et al. |
| 2011/0293009 A1 | 12/2011 | Steinberg et al. |
| 2011/0293012 A1 | 12/2011 | Au et al. |
| 2012/0008683 A1 | 1/2012 | Karczewicz et al. |
| 2012/0057360 A1 | 3/2012 | Swan |
| 2012/0057630 A1 | 3/2012 | Saxena et al. |
| 2012/0128066 A1 | 5/2012 | Shibahara et al. |
| 2012/0162455 A1 | 6/2012 | Kim et al. |
| 2012/0170649 A1 | 7/2012 | Chen et al. |
| 2012/0177116 A1 | 7/2012 | Panusopone et al. |
| 2012/0201298 A1 | 8/2012 | Panusopone et al. |
| 2012/0230411 A1 | 9/2012 | Liu et al. |
| 2012/0230418 A1 | 9/2012 | Sole Rojals et al. |
| 2012/0308128 A1 | 12/2012 | Oosake |
| 2013/0003824 A1 | 1/2013 | Guo et al. |
| 2013/0003828 A1 | 1/2013 | Cohen et al. |
| 2013/0003859 A1 | 1/2013 | Karczewicz et al. |
| 2013/0022107 A1 | 1/2013 | Van der Auwera et al. |
| 2013/0034152 A1 | 2/2013 | Song et al. |
| 2013/0034169 A1 | 2/2013 | Sadafale et al. |
| 2013/0070845 A1 | 3/2013 | Lim et al. |
| 2013/0089138 A1 | 4/2013 | Guo et al. |
| 2013/0089145 A1 | 4/2013 | Guo et al. |
| 2013/0114730 A1 | 5/2013 | Joshi et al. |
| 2013/0128974 A1 | 5/2013 | Chien et al. |

(56) References Cited

U.S. PATENT DOCUMENTS

| | | | |
|---|---|---|---|
| 2013/0136175 | A1 | 5/2013 | Wang et al. |
| 2013/0156328 | A1 | 6/2013 | Wang et al. |
| 2013/0176211 | A1 | 7/2013 | Inada et al. |
| 2013/0243083 | A1 | 9/2013 | Sezer |
| 2013/0272422 | A1 | 10/2013 | Lee et al. |
| 2013/0315303 | A1 | 11/2013 | Min et al. |
| 2013/0336410 | A1 | 12/2013 | Nguyen et al. |
| 2014/0010295 | A1 | 1/2014 | Lu et al. |
| 2014/0086314 | A1 | 3/2014 | Hebel et al. |
| 2014/0092956 | A1 | 4/2014 | Panusopone et al. |
| 2014/0328387 | A1* | 11/2014 | Puri ............. H04N 19/176 375/240.02 |

FOREIGN PATENT DOCUMENTS

| | | | |
|---|---|---|---|
| WO | 99018735 | A1 | 4/1999 |
| WO | 2010039015 | A2 | 4/2010 |
| WO | 2010039288 | A1 | 4/2010 |
| WO | 2011049399 | A2 | 4/2011 |
| WO | 2011/112239 | A1 | 9/2011 |
| WO | 2012005099 | A1 | 1/2012 |
| WO | 2012166959 | A1 | 12/2012 |
| WO | 2014031544 | A1 | 2/2014 |
| WO | 2014/078068 | A1 | 5/2014 |
| WO | 2014075552 | A1 | 5/2014 |
| WO | 2014078703 | A1 | 5/2014 |

OTHER PUBLICATIONS

Chen P. et al., "Video coding using extended block sizes," VCEG Meeting, San Diego, US; No. VCEG-AJ23, Oct. 15, 2008.

Chen, Y, J. Han, T. Nanjundaswamy, and K. Rose, "A joint spatia-temporal filtering approach to efficient prediction in video compression," Picture Coding Symposium, 2013.

Guo L et al.: "Transform Selection for Inter-Layer Texture Prediction in Scalable Video Coding", 11. JCT-VC Meeting; 102; MPEG Meeting; Oct. 10, 2012-Oct. 19, 2012; Shanghai; (Joint Collaborative Team on Video Coding of ISO/IEC JTC/WG11 and ITU-T SG.16); url:http://wftp3.otu.int/av-arch/jctvg-site/,, No. JCTVC-K0321, Oct. 7, 2012, all pages.

Han et al., "Jointly Optimized Spatial Prediction and Block Transform for Video and Image Coding," IEEE Transactions on Image Processing, vol. 21, No. 4 (Apr. 2012).

Han et al., "Toward Jointly Optimal Spatial Prediction and Adaptive Transform in Video/Image Coding," ICASSP 2010 (Dallas, TX, Mar. 14-19, 2010).

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Krit Panusopone et al., "Flexible Picture Partitioning", JCT-VC (Joint Collaborative Team on Video Coding) JCTVC-C260, Meeting, Oct. 7-Oct. 15, 2010

Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.

Lee B et al. "Hierarchical variable block transform," JCT-VC Meeting, Geneva, Switzerland; No. JCTVC-B050; Jul. 24, 2010.

Lee T et al.: "TE12.1: Experimental results of transform unit quadtree/2-level test", 3 JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16); url:http://wftp3.itu.int/av-arch/jctvc-site/,, No. JCTVC-C200, Oct. 2, 2010, all pages.

McCann K. et al.; "Video coding technology proposal by samsung (and BBC)," JCT-VC Meeting; Dresden, Germany, Apr. 15, 2010.

Saxena A et al: "On secondary transforms for intra/inter prediction residual", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); url:http://wftp3.itu.int/av-arch/jctvg-site/,, No. JCTVC-I0232, Apr. 17, 2012, all pages.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Sikora, T. et al, Shape-adaptive DCT for generic coding of video, Circuits and Systems for Video Technology, IEEE Transactions on vol. 5, Issue 1, p. 59-62, Feb. 1, 1995.

Weigand et al, "Overview of the H 264/AVC Video Coding Standard," IEEE Transactions on Circuits and Systems for Video Technology, vol. 13, No. 7, pp. 568, 569, Jul. 1, 2003.

Wiegand et al. "BoG report: residual quadtree structure" JCTVC-C319_r1, Guangzhou, CN Oct. 2010.

Xin, J., K. N. Ngan, and G. Zhu, "Combined inter-intra prediction for high definition video coding," Picture Coding Symposium, 2007.

International Preliminary Report and Written Opinion of the International Searching Authority for International Application No. PCT/US2013062216 dated Mar. 31, 2015.

Saxena A et al.: "On secondary transforms for Intra BVL residue", 13. JCT-VC Meeting; 104. MPEG Meeting; Apr. 18, 2013-Apr. 26, 2013; IncHEON; (Joint Collaborative Team on Video Coding of ISO/IEC JTC1/SC29/WG11 and ITU-T SG.16); url:http://wftp3.itu.int/av-arch/jctvc-site/, No. JCTVC-M0033, Apr. 9, 2013, all pages.

Wiegand, Thomas, et al.; Long-Term Memory Motion-Compensated Prediction, date unknown.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Bankoski et al. "Technical Overview of VP8, an Open Source Video Codec for the Web". Dated Jul. 11, 2011.

Bankoski et al. "VP8 Data Format and Decoding Guide; draft-bankoski-vp8-bitstream-02" Network Working Group. Internet-Draft, May 18, 2011, 288 pp.

Bross, B, H. Kirchoffer, H. Schwarz, T. Wiegand,"Fast intra encoding for fixed maximum depth of transform quadtree," JCTVC-C311_r1, Guangzhou, CN, Oct. 2010.

Chen J et al. "Description of scalable video coding technology proposal by Qualcomm (configuration)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); url:http://wftp3.itu.int/av-arch/jctvc-site/, No. JCTVC-K0035, Oct. 2, 2012, all pages.

International Search Report and Written Opinion of the International Searching Authority of International Application No. PCT/US2016/040186 dated Sep. 6, 2016.

Zhao et al., "Rate-Distortion Optimized Transform", International Organisation for Standardisation Organisation Internationale De Normalisation ISO/IEC JTC1/SC29/WG11 Coding of Moving Pictures and Audio. Oct. 2009.

Reader, Cliff; "History of MPEG Video Compression Ver. 4.0"; JVT Meeting Oct. 14, 2002-Oct. 18, 2002; pp. 1-84.

Abhayaratne G: 'Orthonormal integer block transforms for lossless coding: design and performance analysis', Visual Communications and Image Processing; 8-7-2883-11-7-2003; Lugano, Jul. 8, 2003; pp. 1719-1729.

* cited by examiner

TRANSFORM SELECTION FOR NON-BASEBAND SIGNAL CODING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Such techniques often introduce artifacts into the reconstructed video signal.

SUMMARY

This disclosure relates in general to encoding and decoding visual data, such as video stream data, for transmission or storage using transform selection for non-baseband signal coding. Non-baseband signals include a relatively large number of sharp edges and staircase changes in a video image as opposed to natural video signals, where pixel values most often change smoothly.

One method taught herein describes receiving a video signal, the video signal including a non-baseband signal having a plurality of frames, each formed of a plurality of blocks, and each block having a plurality of pixels. For each prediction mode of a plurality of prediction modes, the method includes generating a prediction block for encoding a current block using the prediction mode, generating a residual block based on the prediction block and the current block, transforming the residual block using a sinusoidal-based transform, generating a first rate-distortion value for encoding the residual block using the sinusoidal-based transform, transforming the residual block using a staircase-based transform, and generating a second rate-distortion value for encoding the residual block using the staircase-based transform. The method also includes selecting one of the staircase-based transform or the sinusoidal-based transform for encoding the residual block based on a lowest value of the first rate-distortion value and the second rate-distortion value among results for each prediction mode, and encoding the current block using the one of the staircase-based transform or the sinusoidal-based transform.

An apparatus described herein includes a memory and a processor. According to one implementation, the processor is configured to execute instructions stored in the memory to receive the video signal, each frame of the video signal including a non-baseband signal having a plurality of frames, each formed of a plurality of blocks, and each block having a plurality of pixels, and, for each prediction mode of a plurality of prediction modes, generate a prediction block for encoding a current block using the prediction mode, generate a residual block based on the prediction block and the current block, transform the residual block using a sinusoidal-based transform, generate a first rate-distortion value for encoding the residual block using the sinusoidal-based transform, transform the residual block using a staircase-based transform, and generate a second rate-distortion value for encoding the residual block using the staircase-based transform. The processor is further configured to executed instructions stored in the memory to select one of the staircase-based transform or the sinusoidal-based transform for encoding the residual block based on a lowest value of the first rate-distortion value and the second rate-distortion value among results for each prediction mode, and encode the current block using the one of the staircase-based transform or the sinusoidal-based transform.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

A video stream may be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

One technique to achieve superior compression performance exploits spatial and temporal correlation of video signals through spatial and/or motion compensated prediction. Transform coding subsequent to prediction is another technique that improves video compression. Generally, transform coding aims to largely remove the statistical redundancy between residual pixels after prediction. Compression performance of a transform relies on the ability to decorrelate residual pixel redundancy and compact the energy into a subset of transform coefficients. Sinusoidal-based transform types are most commonly used for such decorrelation.

Artifacts such as ringing are common when sharp edges or corners are coded with a sinusoidal-based transform, such a discrete cosine transform, at low/medium bit-rate. This is often addressed conventionally through the use of filters or through higher quality encoding near or at edges. Because natural video signals represent images where pixel values commonly change gradually or smoothly, this is a lesser problem for natural video signals that non-baseband video signals. According to the teachings herein, non-baseband signals, often seen in the context of computer screen content (e.g., text slides, user interfaces), and scenes generated via computer-graphics (e.g., animation) are encoded by a selection process between a sinusoidal-based transform (also called a sinusoidal-based transform type herein) and a staircase-based transform (also called a staircase-based transform type herein). A staircase-based transform is defined as a collection of complete orthonormal transform basis. That is, base vectors are orthogonal to each other and the linear combination of base vectors covers the entire vector space. A staircase-based transform can better capture sharp edges and approximates staircase changes. In terms of visual quality, such a transform naturally avoids ringing artifacts. Therefore, allowing the selection of a staircase-based transform can potentially represent the input signal with less bit cost and also compress the signal more efficiently. Further details are described after an initial discussion of the environment in which the teachings herein may be used.

Figure 1:
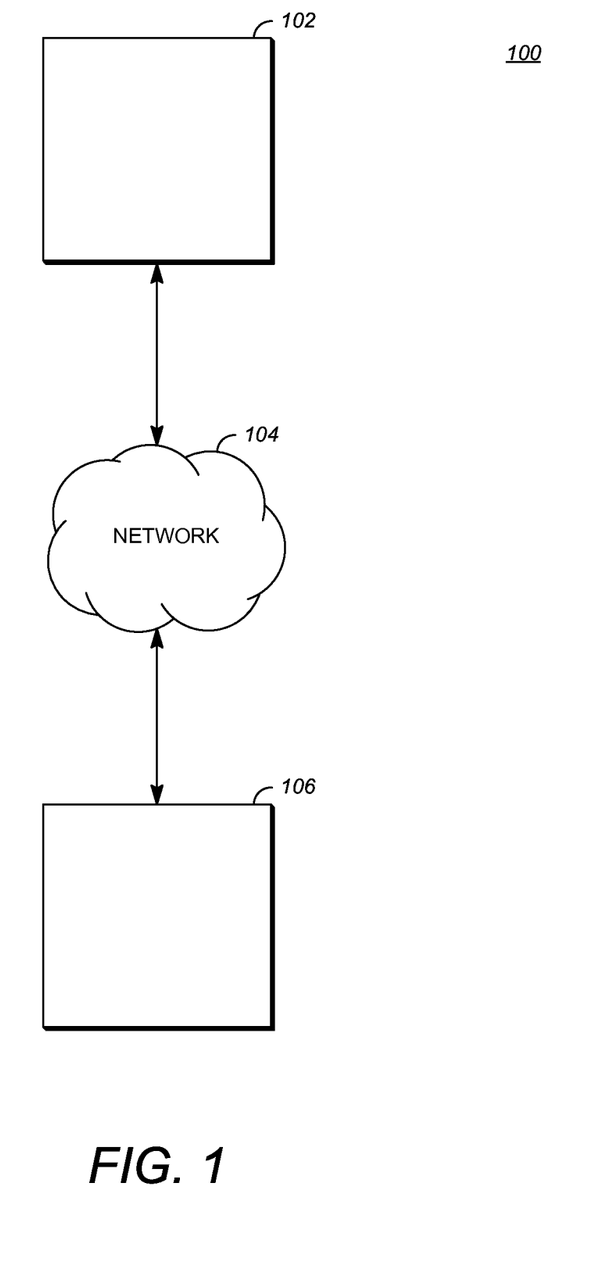
FIG. 1 is a schematic of a video encoding and decoding system.

FIG. 1 is a schematic of a video encoding and decoding system 100. An transmitting station 102 can be, for example, a computer having an internal configuration of hardware such as that described in FIG. 2. However, other suitable implementations of transmitting station 102 are possible. For example, the processing of transmitting station 102 can be distributed among multiple devices.

A network 104 can connect transmitting station 102 and a receiving station 106 for encoding and decoding of the video stream. Specifically, the video stream can be encoded in transmitting station 102 and the encoded video stream can be decoded in receiving station 106. Network 104 can be, for example, the Internet. Network 104 can also be a local area network (LAN), wide area network (WAN), virtual private network (VPN), cellular telephone network or any other means of transferring the video stream from transmitting station 102 to, in this example, receiving station 106.

Figure 2:
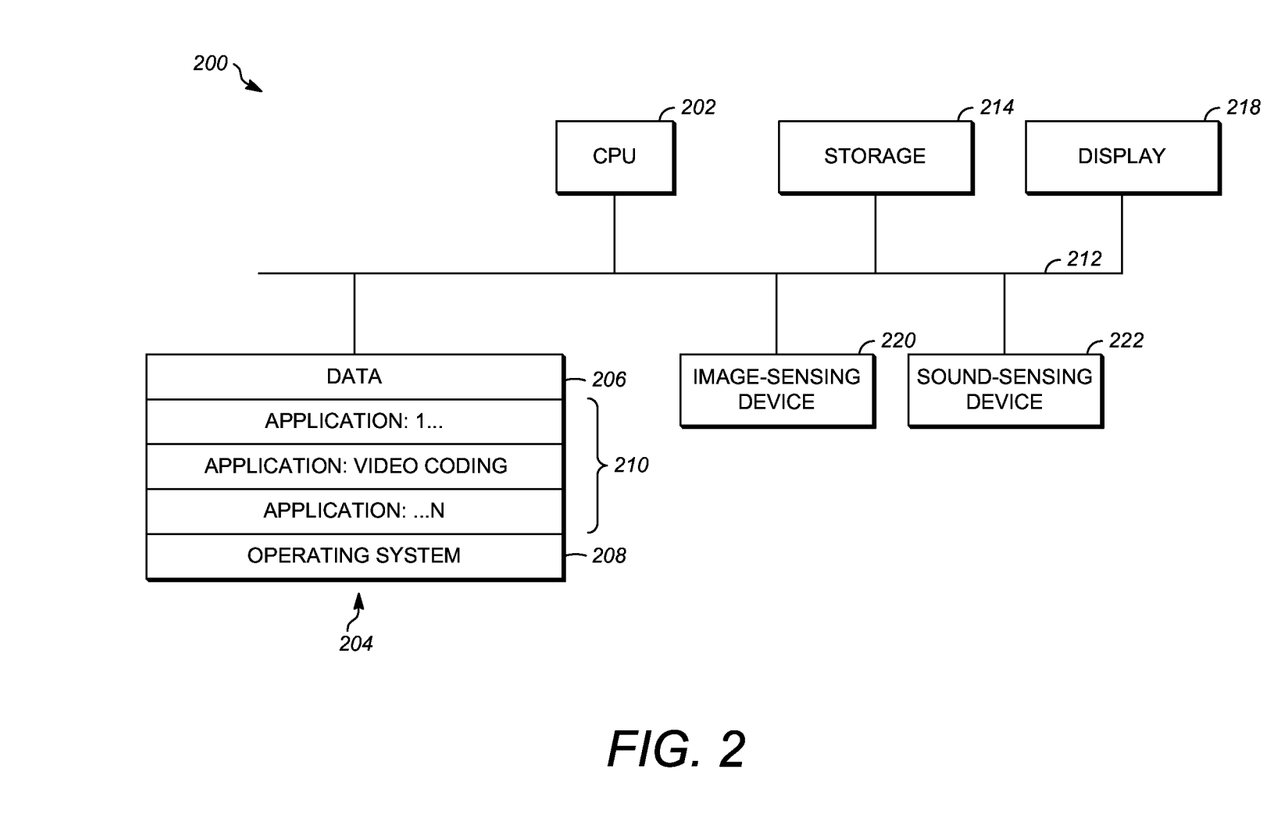
FIG. 2 is a block diagram of an example of a computing device that can implement a transmitting station or a receiving station.

Receiving station 106, in one example, can be a computer having an internal configuration of hardware such as that described in FIG. 2. However, other suitable implementations of receiving station 106 are possible. For example, the processing of receiving station 106 can be distributed among multiple devices.

Other implementations of video encoding and decoding system 100 are possible. For example, an implementation can omit network 104. In another implementation, a video stream can be encoded and then stored for transmission at a later time to receiving station 106 or any other device having memory. In one implementation, receiving station 106 receives (e.g., via network 104, a computer bus, and/or some communication pathway) the encoded video stream and stores the video stream for later decoding. In an example implementation, a real-time transport protocol (RTP) is used for transmission of the encoded video over network 104. In another implementation, a transport protocol other than RTP may be used, e.g., an HTTP-based video streaming protocol.

When used in a video conferencing system, for example, transmitting station 102 and/or receiving station 106 may include the ability to both encode and decode a video stream as described below. For example, receiving station 106 could be a video conference participant who receives an encoded video bitstream from a video conference server (e.g., transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, computing device 200 can implement one or both of transmitting station 102 and receiving station 106 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 202 in computing device 200 can be a conventional central processing unit. Alternatively, CPU 202 can be any other type of device, or multiple devices, capable of manipulating or processing information now-existing or hereafter developed. Although the disclosed implementations can be practiced with a single processor as shown, e.g., CPU 202, advantages in speed and efficiency can be achieved using more than one processor.

A memory 204 in computing device 200 can be a read only memory (ROM) device or a random access memory (RAM) device in an implementation. Any other suitable type of storage device can be used as memory 204. Memory 204 can include code and data 206 that is accessed by CPU 202 using a bus 212. Memory 204 can further include an operating system 208 and application programs 210, the application programs 210 including at least one program that permits CPU 202 to perform the methods described here. For example, application programs 210 can include applications 1 through N, which further include a video coding application that performs the methods described here. Computing device 200 can also include a secondary storage 214, which can, for example, be a memory card used with a mobile computing device 200. Because the video communication sessions may contain a significant amount of information, they can be stored in whole or in part in secondary storage 214 and loaded into memory 204 as needed for processing.

Computing device 200 can also include one or more output devices, such as a display 218. Display 218 may be, in one example, a touch sensitive display that combines a display with a touch sensitive element that is operable to sense touch inputs. Display 218 can be coupled to CPU 202 via bus 212. Other output devices that permit a user to program or otherwise use computing device 200 can be provided in addition to or as an alternative to display 218. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 220, for example a camera, or any other image-sensing device 220 now existing or hereafter developed that can sense an image such as the image of a user operating computing device 200. Image-sensing device 220 can be positioned such that it is directed toward the user operating computing device 200. In an example, the position and optical axis of image-sensing device 220 can be configured such that the field of vision includes an area that is directly adjacent to display 218 and from which display 218 is visible.

Computing device 200 can also include or be in communication with a sound-sensing device 222, for example a microphone, or any other sound-sensing device now existing or hereafter developed that can sense sounds near computing device 200. Sound-sensing device 222 can be positioned such that it is directed toward the user operating computing device 200 and can be configured to receive sounds, for example, speech or other utterances, made by the user while the user operates computing device 200.

Although FIG. 2 depicts CPU 202 and memory 204 of computing device 200 as being integrated into a single unit, other configurations can be utilized. The operations of CPU 202 can be distributed across multiple machines (each machine having one or more of processors) that can be coupled directly or across a local area or other network. Memory 204 can be distributed across multiple machines such as a network-based memory or memory in multiple machines performing the operations of computing device 200. Although depicted here as a single bus, bus 212 of computing device 200 can be composed of multiple buses. Further, secondary storage 214 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
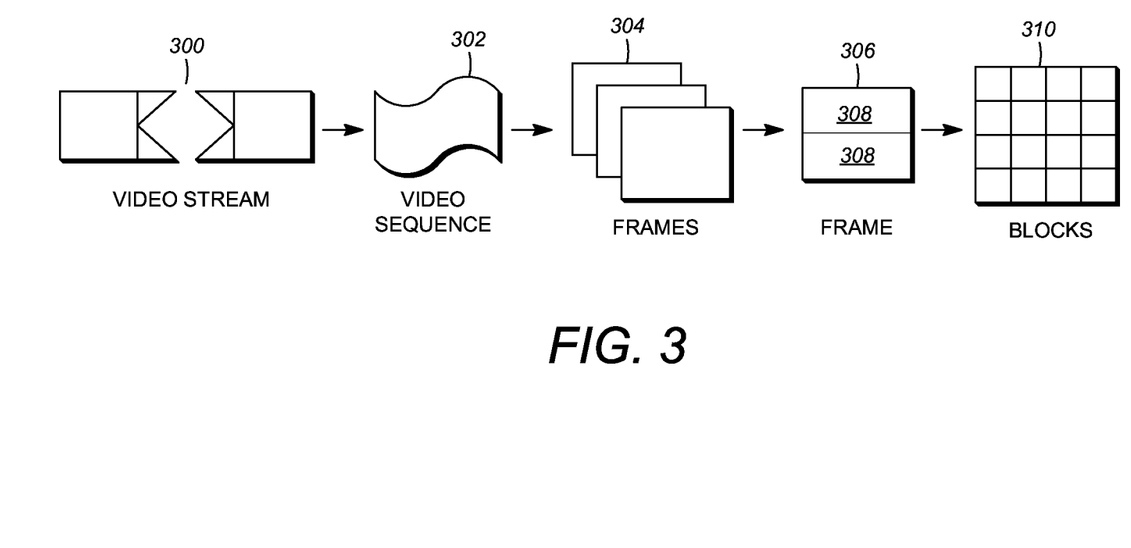
FIG. 3 is a diagram of a typical video stream to be encoded and subsequently decoded.

FIG. 3 is a diagram of an example of a video stream 300 to be encoded and subsequently decoded. Video stream 300 includes a video sequence 302. At the next level, video sequence 302 includes a number of adjacent frames 304. While three frames are depicted as adjacent frames 304, video sequence 302 can include any number of adjacent frames 304. Adjacent frames 304 can then be further subdivided into individual frames, e.g., a single frame 306. At the next level, a single frame 306 can be divided into a series of segments or planes 308. Segments (or planes) 308 can be subsets of frames that permit parallel processing, for example. Segments 308 can also be subsets of frames that can separate the video data into separate colors. For example, a frame 306 of color video data can include a luminance plane and two chrominance planes. Segments 308 may be sampled at different resolutions.

Whether or not frame 306 is divided into segments 308, frame 306 may be further subdivided into blocks 310, which can contain data corresponding to, for example, 16×16 pixels in frame 306. Blocks 310 can also be arranged to include data from one or more planes 308 of pixel data. Blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein. Frame 306 may be partitioned according to the teachings herein as discussed in more detail below.

Figure 4:
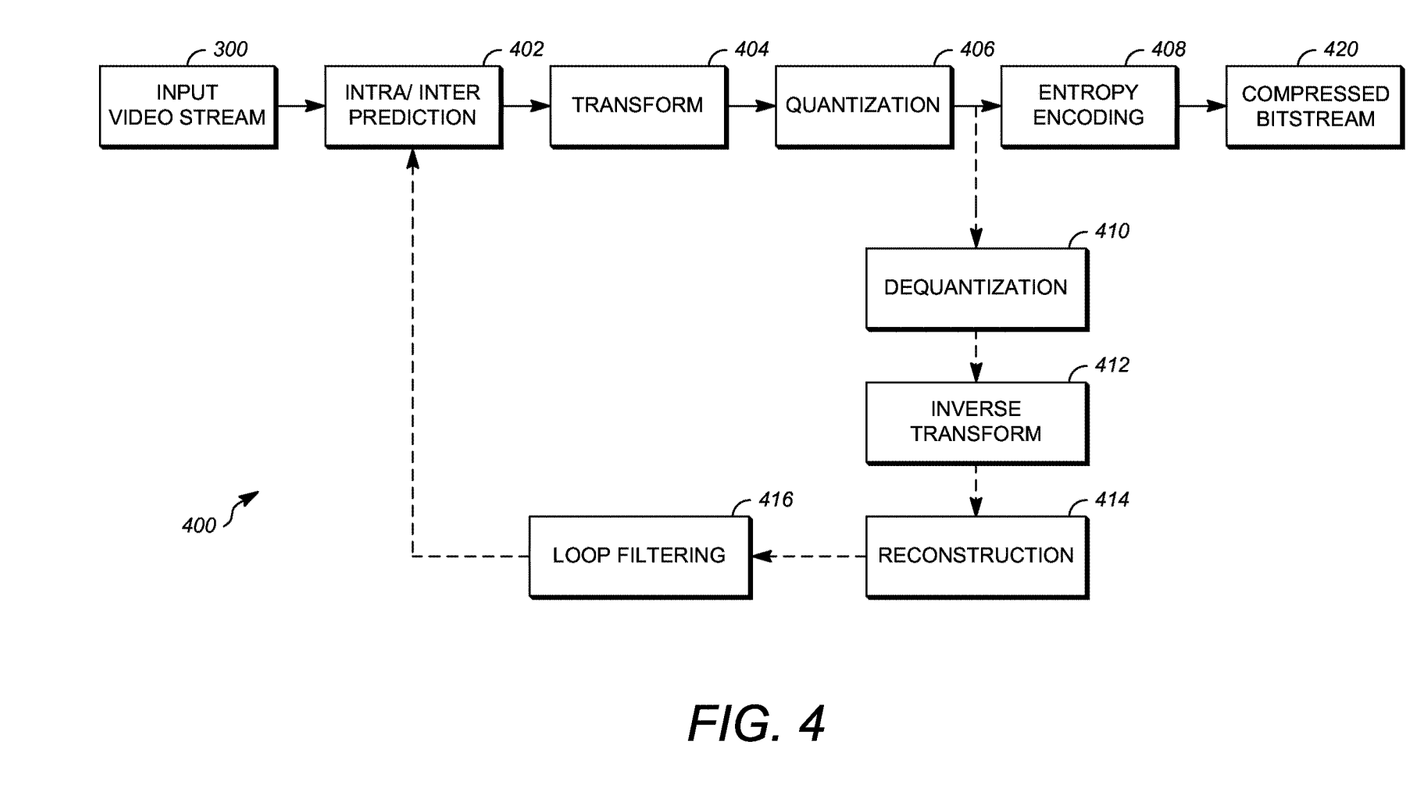
FIG. 4 is a block diagram of a video compression system in according to an aspect of the teachings herein.

FIG. 4 is a block diagram of an encoder 400 in accordance with an implementation. Encoder 400 can be implemented, as described above, in transmitting station 102 such as by providing a computer software program stored in memory, for example, memory 204. The computer software program can include machine instructions that, when executed by a processor such as CPU 202, cause transmitting station 102 to encode video data in the manner described in FIG. 4. Encoder 400 can also be implemented as specialized hardware included in, for example, transmitting station 102. Encoder 400 has the following stages to perform the various functions in a forward path (shown by the solid connection lines) to produce an encoded or compressed bitstream 420 using input video stream 300: an intra/inter prediction stage 402, a transform stage 404, a quantization stage 406, and an entropy encoding stage 408. Encoder 400 may also include a reconstruction path (shown by the dotted connection lines) to reconstruct a frame for encoding of future blocks. In FIG. 4, encoder 400 has the following stages to perform the various functions in the reconstruction path: a dequantization stage 410, an inverse transform stage 412, a reconstruction stage 414, and a loop filtering stage 416. Other structural variations of encoder 400 can be used to encode video stream 300.

When video stream 300 is presented for encoding, each frame 306 can be processed in units of blocks. At intra/inter prediction stage 402, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at intra/inter prediction stage 402 to produce a residual block (also called a residual). Transform stage 404 transforms the residual into transform coefficients in, for example, the frequency domain using block-based transforms. According to the process described further below with respect to FIG. 6, the residual block may be transformed according to either a staircase-based transform or a sinusoidal-based transform at transform stage 404. Staircase-based transform types include, for example, the Haar Wavelet Transform (HWT) and the Walsh-Hadamard Transform (WHT). HWT is a orthonormal transform, while WHT is an orthonormal, symmetric, real number transform. Sinusoidal-based transform types include, for example, the Discrete Cosine Transform (DCT) and the Asymmetric Discrete Sine Transform (ADST). In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. Note that the size of the prediction block, and hence the residual block, may be different from the size of the transform block as also discussed in more detail below with respect to FIG. 6.

Quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by entropy encoding stage 408. The entropy-encoded coefficients, together with other information used to decode the block, which may include for example the type of prediction used, transform type, motion vectors and quantizer value, are then output to the compressed bitstream 420. Compressed bitstream 420 can be formatted using various techniques, such as variable length coding (VLC) or arithmetic coding. Compressed bitstream 420 can also be referred to as an encoded video stream or encoded video bitstream, and the terms will be used interchangeably herein.

The reconstruction path in FIG. 4 (shown by the dotted connection lines) can be used to ensure that both encoder 400 and a decoder 500 (described below) use the same reference frames to decode compressed bitstream 420. The reconstruction path performs functions that are similar to functions that take place during the decoding process that are discussed in more detail below, including dequantizing the quantized transform coefficients at dequantization stage 410 and inverse transforming the dequantized transform coefficients at inverse transform stage 412 to produce a derivative residual block (also called a derivative residual). At reconstruction stage 414, the prediction block that was predicted at intra/inter prediction stage 402 can be added to the derivative residual to create a reconstructed block. Loop filtering stage 416 can be applied to the reconstructed block to reduce distortion such as blocking artifacts.

Other variations of encoder 400 can be used to encode compressed bitstream 420. For example, a non-transform based encoder 400 can quantize the residual signal directly without transform stage 404 for certain blocks or frames. In another implementation, an encoder 400 can have quantization stage 406 and dequantization stage 410 combined into a single stage.

Figure 5:
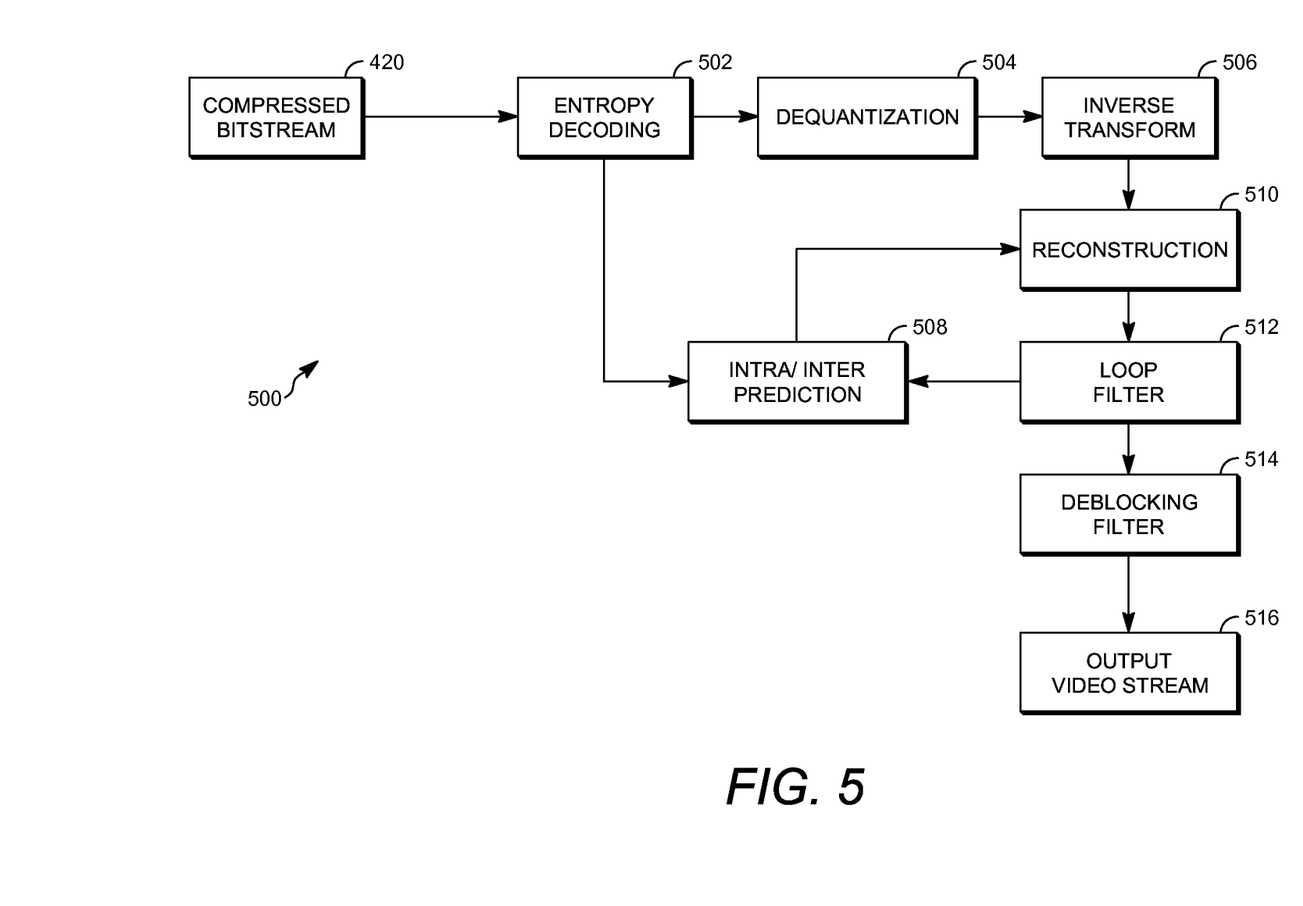
FIG. 5 is a block diagram of a video decompression system according to another aspect of the teachings herein.

FIG. 5 is a block diagram of a decoder 500 in accordance with another implementation. Decoder 500 can be implemented in receiving station 106, for example, by providing a computer software program stored in memory 204. The computer software program can include machine instructions that, when executed by a processor such as CPU 202, cause receiving station 106 to decode video data in the manner described in FIG. 5. Decoder 500 can also be implemented in hardware included in, for example, transmitting station 102 or receiving station 106.

Decoder 500, similar to the reconstruction path of encoder 400 discussed above, includes in one example the following stages to perform various functions to produce an output video stream 516 from compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 420.

When compressed bitstream 420 is presented for decoding, the data elements within compressed bitstream 420 can be decoded by entropy decoding stage 502 as discussed in additional detail herein to produce a set of quantized transform coefficients. Dequantization stage 504 dequantizes the quantized transform coefficients (e.g., by multiplying the quantized transform coefficients by the quantizer value), and inverse transform stage 506 inverse transforms the dequantized transform coefficients using the selected transform type to produce a derivative residual that can be identical to that created by inverse transform stage 412 in encoder 400. Using header information decoded from compressed bitstream 420, decoder 500 can use intra/inter prediction stage 508 to create the same prediction block as was created in encoder 400, e.g., at intra/inter prediction stage 402. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 420. For example, decoder 500 can produce output video stream 516 without deblocking filtering stage 514.

As mentioned above, non-baseband signals may benefit from the use of a staircase-based transform due to a large proportion of edges as compared to natural video signals. However, the non-baseband signals include, in addition to many edges, areas having relatively uniform pixel values (i.e., their color values do not vary much). For such areas, a sinusoidal-based transform may be more efficiently used. Accordingly, encoding a non-baseband signal herein involves encoding blocks of each frame by selecting between a staircase-based transform and a sinusoidal-based transform.

Figure 6:
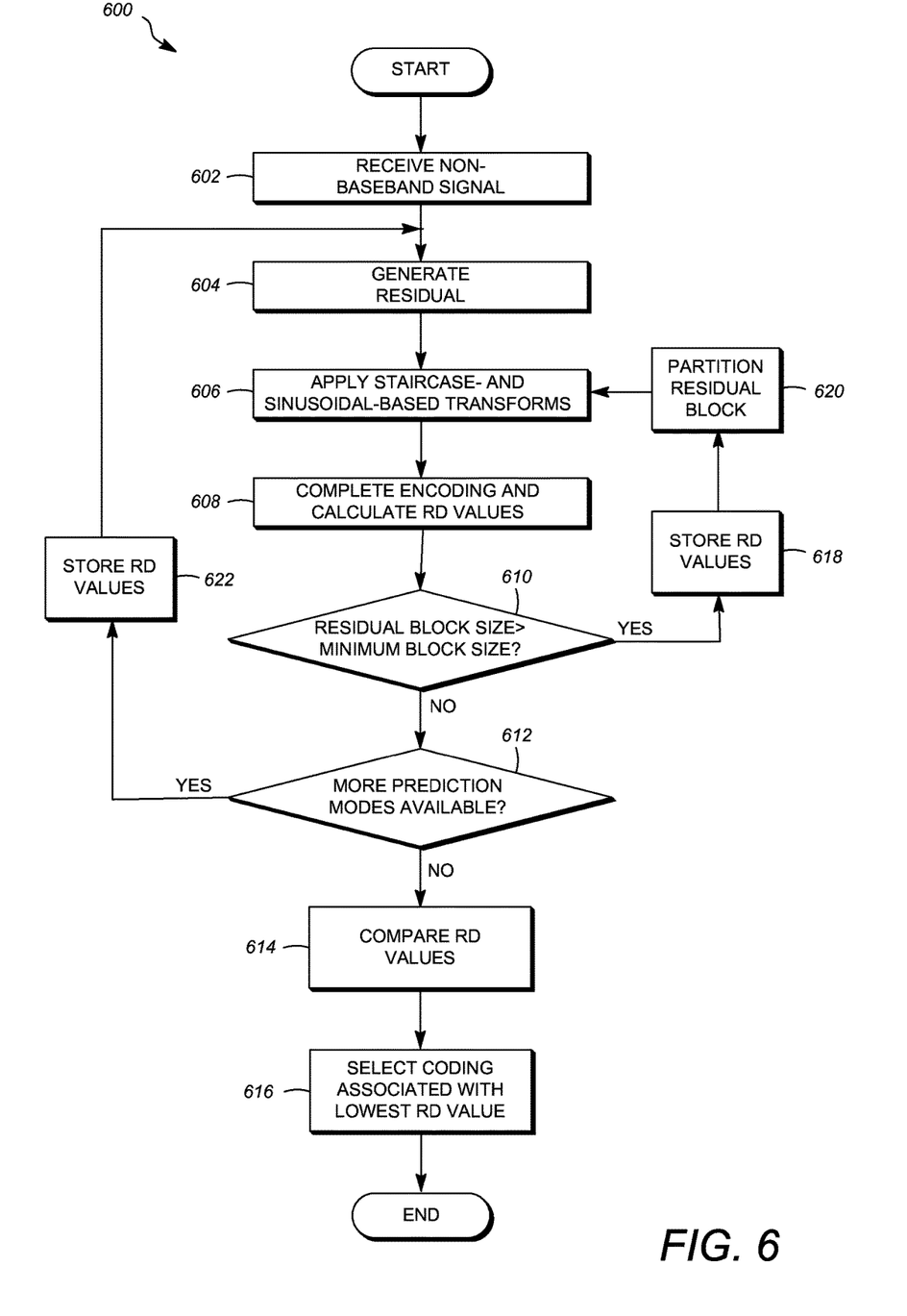
FIG. 6 is a flowchart diagram of a process for encoding a non-baseband signal including selecting a transform type between a sinusoidal-based transform and a staircase-based transform.

FIG. 6 is a flowchart diagram of a process 600 for encoding a non-baseband signal including selecting a transform type between a sinusoidal-based transform and a staircase-based transform. Process 600 can be implemented in a system such as computing device 200 to aid the encoding of a video stream. Process 600 can be implemented, for example, as a software program that is executed by a computing device such as transmitting station 102 or receiving station 106. The software program can include machine-readable instructions that are stored in a memory such as memory 204 that, when executed by a processor such as CPU 202, cause the computing device to perform process 700. Process 600 can also be implemented using hardware in whole or in part. As explained above, some computing devices may have multiple memories and multiple processors, and the steps or operations of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. Process 600 is depicted for encoding of a single block of a single frame. Process 600 may be repeated for some or all blocks of the single frame and/or be repeated for each frame of the input signal. Blocks may be processed in any scan order, such as raster-scan order.

Process 600 initiates by receiving a non-baseband signal at operation 602. Receiving the signal can include receiving the signal from a video screen, retrieving the signal from a memory device or any other way of receiving the signal for processing. In one implementation, the signal is received by separating out a portion of an incoming video stream to form the non-baseband signal. The remaining portions of the incoming video stream could be encoded by any number of known conventional techniques. In certain embodiments, the non-baseband signal comprises computer-generated graphics. Examples of computer-generated graphics include as screencasting and animation.

At operation 604, a residual is generated using a current block to be encoded from a frame of the non-baseband signal. As discussed above, a residual block may be generated, calculated or otherwise produced by selecting a prediction mode and generating a prediction block using the prediction mode, where a difference between the prediction block and the current block is the residual block, also called the residual.

At operation 606, a staircase-based transform and a sinusoidal-based transform are each applied to the residual. That is, the residual is transformed using the staircase-based transform, and the residual is also transformed using the sinusoidal-based transform. For efficient computation of the staircase-based transform with low complexity, a butterfly algorithm or computational structure may be used. The transforms can be applied sequentially or at the same time. This operation results in two transform blocks comprising a plurality of transform coefficients. Each transform block is encoded and a rate-distortion value associated with the transform block is calculated at operation 608.

Encoding a transform block at operation 608 optionally includes quantizing the transform coefficients of the transform block and generating header information including how the block was encoded. If lossless encoding is to be used on the block, quantizing the transform coefficients may be omitted and encoding at operation 608 is completed by generating the header information. In order to calculate rate-distortion values at operation 608, the encoded block is decoded using the header information. Operation 608 forms part of the rate-distortion loop for encoding the current block. A rate-distortion loop determines the rate, or number of bits output from the encoding process versus the distortion, or change in visual quality of the video stream as a result of encoding and decoding. Distortion can be measured in a number of different ways including measuring the mean squared error (difference) between the data of the video stream before encoding and decoding and the data of the video stream following encoding and decoding. Thus, a rate-distortion value is a measure of the number of bits required to represent the encoded block (or other subdivision of a video stream) for a given level of distortion. In some implementations, operation 608 may be performed both with and without quantization to generate two rate-distortion values for encoding the block using the staircase-based transform and two rate-distortion values for encoding the block using the sinusoidal-based transform. In other implementations, operation 608 may be performed omitting quantization with only one of the transform blocks, such as the transform block generated using the staircase-based transform.

At operation 610, a query occurs whereby the residual block size is compared to a minimum block size for the transform block. In some cases a transform mode is available whereby the transform type can be applied to a smaller block than the residual block. For example, the smallest (i.e., minimum) block size may be 4×4 pixels. In the comparison of operation 610, process 600 advances to operation 612 when the residual block size is greater than the minimum block size.

At operation 612, process 600 inquires as to whether more prediction modes are available for testing. As mentioned briefly above, prediction modes encompass inter- and intra-prediction. Intra-prediction may include a number of modes indicating the directional of pixel propagation used to generate the prediction block. In some cases, prediction modes may be associated with a size. For example, the block may be a large block that is predicted according to a number of prediction modes such as a 4×4 inter-prediction mode, an 8×8 inter-prediction mode, several 4×4 intra-prediction modes and several 8×8 intra-prediction modes by appropriating dividing the large block.

If additional prediction modes are not available, process 600 advances to operation 614 to compare the generated rate-distortion values. At operation 616, the coding associated with the lowest rate-distortion value is selected to encoding the block. For example, if only one prediction mode is available, and the residual block size is equal to the minimum block size, the lower of the rate-distortion values of a first value generated at operation 608 using the staircase-based transform and a second value generated at operation 608 using the sinusoidal-based transform. If more than one rate-distortion value is generated using staircase-based transform, the sinusoidal-based transform, or both, the lowest of the rate-distortion values is identified. The coding selected would include the prediction mode and transform mode (i.e., either the staircase-based transform or the sinusoidal-based transform and the transform size). Optionally, the selected coding may include whether or not quantization is performed as part of the encoding process.

After operation 616, the block is encoded. Encoding the resulting transform block may include entropy coding the transform block by entropy coding the transform coefficients in a scan order such as a zig-zag scan order. In some cases, encoding the resulting transform block includes quantizing the transform coefficients of the transform block and then entropy coding the transform block by entropy coding the quantized transform coefficients in a scan order such as a zig-zag scan order.

Returning to operation 610, if the residual block size is greater than the minimum block size it is possible that smaller transforms may be applied to the current residual block. This is achieved in process 600 by advancing to operation 618, where the rate-distortion values calculated at operation 608 are stored for a later use, and then advancing to operation 620, where the residual block is partitioned into smaller blocks. Desirably, the partitioning divides the residual block into a non-overlapping plurality of sub-blocks before returning to operation 606. At operation 606, the staircase-based transform is applied to each sub-block of the plurality of sub-blocks to generate transform sub-blocks, and the sinusoidal-based transform is applied to each sub-block of the plurality of sub-blocks to also generate transform sub-blocks.

In some implementations, the encoding and calculation of rate-distortion values at next operation 608 occurs for each sub-block. That is, each sub-block transformed using the sinusoidal-based transform is separately encoded and decoded to calculate respective rate-distortion values, which are then summed for a single rate-distortion value for the current block that is associated with the particular prediction mode and transform mode—the sinusoidal-based transform and the transform size. Similarly, each sub-block transformed using the staircase-based transform is separately encoded and decoded to calculate respective rate-distortion values, which are then summed for a single rate-distortion value for the current block that is associated with the particular prediction mode and transform mode—the staircase-based transform and the transform size. More commonly, this calculation is done at the block level, not the sub-block level as the header bits are associated with the block. For example, the sub-blocks transformed using the sinusoidal-based transform or the staircase-based transform are encoded, optionally using quantization, and decoded to generate a rate-distortion value for the block without calculating separate rate-distortion values for each sub-block.

Process 600 then continues as discussed above. Assuming the residual block size is no longer larger than the minimum block size in response to the query of operation 610 and there are no further prediction modes available in response to the query of operation 612, the stored rate-distortion values and current rate-distortion values are compared at operation 614 to select the coding associated with the lowest rate-distortion value at operation 616. The selected coding includes the prediction mode and the staircase-based transform and transform size or the sinusoidal-based transform and transform size that resulted in the lowest-rate distortion value among the rate-distortion values.

If additional prediction modes are available in response to the query at operation 612, process 600 stores the calculated rate-distortion values at operation 622 and returns to operation 604 to generate a new residual using the new prediction mode. Once all transform block sizes and all prediction modes are tested, the current rate-distortion values are compared to all the generated and stored rate-distortion values at operation 614 to select the coding at operation 616. The current block is then encoded into the bitstream.

As mentioned, the order of operations and content of process 600 may vary. For example, process 600 is described where the prediction mode and transform mode are selected on a per-block basis using a single rate-distortion loop. In one alternative implementation, the best prediction mode for a block using only a sinusoidal-based transform type may be selected in one rate-distortion loop, while the best prediction mode for the block using only a staircase-based transform type may be selected in a separate loop. Then, the better combination of prediction mode and transform is selected for the block. Further, process 600 uses the same transform type for all sub-blocks of a residual block when the block is partitioned at operation 620. This is expected to be more efficient for coding as signaling of the transform type is not required for sub-blocks, and decoding the block can rely upon one-time signaling of the transform type (including size) regardless of how many sub-blocks exist. Moreover, the rate-distortion loop is computationally intense, and using the same transform type for sub-blocks involves fewer computations than alternatives. It is possible, however, that various combinations of sinusoidal- and staircase-based transforms are used in generating rate-distortion values for the sub-blocks to select transform type(s) for those sub-blocks. The techniques described herein also work where additional processing is used to limit the number of prediction modes.

Process 600 describes performing the selection between one staircase-based transform and one sinusoidal-based transform by example. In still other implementations, more than one staircase-based transform and/or more than one sinusoidal-based transform may be used to generate rate-distortion values for comparison at operation 614. As one example, the results for each of HWT and WHT may be compared to results for one sinusoidal-based transform, such as DCT, or for more than one sinusoidal-based transform, such as DCT and ADST. Further, the selection may also be made between one of three types of transform coding available for each of the staircase-base transform and the sinusoidal-based transform. Conventionally, two-dimensional (2D) transforms are adopted for sinusoidal-based transforms, and the staircase-based transform may also be used as a 2D transform. However, a one-dimensional (1D) transform in the vertical direction, the horizontal direction, or both, may be adopted for one or both of the staircase-base transform and the sinusoidal-based transform. A vertical or horizontal 1D transform type is particularly desirable with the staircase-based transform when edge and staircase data is involved. It has been found that in edge data where a staircase-based transform is applied, a 1D staircase-based transform more effectively captures the directionality of the residuals than a 2D staircase-based transform and hence is more efficient in coding. In one implementation, selection is made between a 1D staircase transform that applies the staircase transform to the vertical direction only, a 1D staircase transform that applies the staircase transform to the horizontal direction only, a 2D staircase transform that applies the staircase transform to both the vertical and horizontal directions, and a 2D sinusoidal transform that applies the staircase transform to both the vertical and horizontal directions.

In some cases, all of rate-distortion values may not be compared at operation 614. For example, when multiple passes of the loop are performed (e.g., for different transform types, different block/sub-block sizes, or different prediction modes), the rate-distortion values generated may be compared before operation 618 and/or operation 622 so that only the lowest rate-distortion value is stored in association with its prediction mode and transform mode (e.g., transform type and transform size). Then, each new rate-distortion value may be compared to that lowest value and stored if it is the lower than the previously-stored value or discarded if it is not lower than the previously-stored value.

The decoding process of a video bitstream encoded as described herein may be as described with respect to FIG. 5. In the data sent within the bitstream, one or more bits may be used within a header to indicate a transform size and which of the transform types is selected for each block, segment or frame. When quantization is omitted from the encoding of a block, dequantization is omitted from decoding of the block.

Staircase-based transform coding is a compression technique for video signals that decorrelates signal dependencies and compacts the signal energy into a small subset of transform coefficients. Incorporating staircase-based transform coding as an alternative to sinusoidal-based transform coding increases coding performance by compressing non-baseband signals more efficiently. In particular, the staircase-based transform is advantageous for screen content videos, which contain computer generated scenes, captures of monitor screen, gaming graphics, etc. The staircase-based transform can better approximate the statistical properties of a certain class of video signals that contains a large portion of sharp changes and staircase signals (e.g., animation and text images) than conventional DCT (a sinusoidal-based transform) can.

In one implementation, WHT is implemented as the staircase-based transform for block coding of different transform sizes, e.g., 4×4, 8×8, and 16×16. WHT may be selected instead of DCT to encode and decode portions of the video signal. In such an example, the encoder transforms the prediction residual signal via WHT and DCT, respectively. The transform coefficients are then quantized to compute the rate and distortion costs. The encoder selects amongst WHT and DCT (and possibly other transform types) the one that provides a minimum rate-distortion cost and sends this information in a bit (or more bits, if more transform types allowed) to the decoder. The decoder reads the transform type information from the bit-stream and applies the corresponding inverse transform in a decoding process to reconstruct the signal.

The staircase-based transform shows superiority in smaller transform blocks than in larger transform blocks. It is believed that this is due to sharp changes and staircase signals being averaged and overwhelmed in a large scale transform. For this reason, some implementations of the teachings herein subdivide each coding block for smaller transform blocks to select the transform type (WHT or DCT or others) per transform block. Also for this reason, not all block sizes may be processed according to FIG. 6 in some implementations. For example, some block/sub-block sizes may be limited to testing only staircase-based transforms, while others may be limited to testing only sinusoidal-based transforms. In one implementation of this variation, a prediction block may comprise 64×64 pixels. Assuming this size and sub-blocks of 4×4 pixels, 8×8 pixels, 16×16 pixels and 32×32 pixels are processed, the prediction block (64×64 pixels) and the sub-blocks comprising 32×32 pixels may be limited to sinusoidal-based transforms, while the sub-blocks comprising 4×4 pixels, 8×8 pixels, or 16×16 pixels may be limited to staircase-based transforms. In another variation, some block sizes are processed using at least one staircase-based transform and at least one sinusoidal-based transform while other block sizes are processed using only one type.

The staircase-based transform is often composed of integer elements, which allows fast computation and do not require rounding operations in the middle steps. This feature makes it capable of supporting lossless coding. That is, all sinusoidal-based transforms result in some loss of data even when quantization is not used due to the process of transformation and inverse transformation. The same is not true of staircase-based transforms. Accordingly, omitting quantization when using a staircase-based transform results in lossless coding for a block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other suitable transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal, comprising:
   receiving the video signal at a computing device, the video signal including a non-baseband signal having a plurality of frames formed of blocks, the blocks formed of pixels, and the non-baseband signal comprising one of a screencast or computer-generated animation;
   for each block of a plurality of blocks of a current frame, and for each prediction mode of a plurality of prediction modes:
      generating a prediction block for encoding a current block using the prediction mode;
      generating a residual block based on the prediction block and the current block;
      comparing a size of the residual block generated using the selected prediction mode to a minimum block size for a transform block;
      responsive to determining that the size of the residual block is equal to the minimum block size:
         transforming the residual block using a sinusoidal-based transform;
         generating a first rate-distortion value for encoding the residual block using the sinusoidal-based transform;
         transforming the residual block using a staircase-based transform; and
         generating a second rate-distortion value for encoding the residual block using the staircase-based transform;
      responsive to determining that the size of the residual block is above the minimum block size:

splitting the residual block into a plurality of non-overlapping sub-blocks;
for each sub-block of the plurality of sub-blocks from the residual block:
transforming the sub-block using the sinusoidal-based transform; and
transforming the sub-block using the staircase-based transform;
generating the first rate-distortion value by encoding the plurality of sub-blocks using the sinusoidal-based transform; and
generating the second rate-distortion value by encoding the plurality of sub-blocks using the staircase-based transform;
selecting a prediction mode of the plurality of prediction modes and one of the staircase-based transform or the sinusoidal-based transform for encoding the residual block based on a lowest value of the first rate-distortion value and the second rate-distortion value among results for each prediction mode; and
encoding the current block using the one of the staircase-based transform or the sinusoidal-based transform, wherein the size of the residual block generated using the selected prediction mode is above the minimum block size for a transform block, and encoding the current block comprises:
encoding each sub-block of the plurality of non-overlapping sub-blocks formed of the residual block using a same one of the staircase-based transform or the sinusoidal-based transform.

2. The method of claim 1 wherein the staircase-based transform is a Walsh-Hadamard transform.

3. The method of claim 2 wherein the sinusoidal-based transform is a Discrete Cosine transform.

4. The method of claim 1 wherein the staircase-based transform is a Walsh-Hadamard transform; and wherein encoding the current block comprises losslessly encoding each sub-block of the plurality of non-overlapping sub-blocks by transforming each sub-block using the Walsh-Hadamard transform to form, respectively, a transform sub-block and entropy coding the transform sub-blocks without performing quantization on the transform sub-blocks.

5. The method of claim 1 wherein the staircase-based transform is a Haar wavelet transform; and wherein encoding the current block comprises losslessly encoding each sub-block of the plurality of non-overlapping sub-blocks using the Haar wavelet transform.

6. An apparatus for encoding a video signal, comprising:
a memory; and
a processor configured to execute instructions stored in the memory to:
receive the video signal, the video signal including a non-baseband signal having a plurality of frames formed of blocks, and the blocks formed of pixels;
for each block of a plurality of blocks of a current frame, and for each prediction mode of a plurality of prediction modes:
generate a prediction block for encoding a current block using the prediction mode;
generate a residual block based on the prediction block and the current block;
compare a size of the residual block generated using the selected prediction mode to a minimum block size for a transform block;
responsive to determining that the size of the residual block is equal to the minimum block size:
transform the residual block using a sinusoidal-based transform;
generate a first rate-distortion value for encoding the residual block using the sinusoidal-based transform;
transform the residual block using a staircase-based transform; and
generate a second rate-distortion value for encoding the residual block using the staircase-based transform;
responsive to determining that the size of the residual block is above the minimum block size:
split the residual block into a plurality of non-overlapping sub-blocks;
for each sub-block of the plurality of sub-blocks from the residual block:
transform the sub-block using the sinusoidal-based transform; and
transform the sub-block using the staircase-based transform;
generate the first rate-distortion value by encoding the plurality of sub-blocks using the sinusoidal-based transform; and
generate the second rate-distortion value by encoding the plurality of sub-blocks using the staircase-based transform;
select a prediction mode of the plurality of prediction modes and one of the staircase-based transform or the sinusoidal-based transform for encoding the residual block based on a lowest value of the first rate-distortion value and the second rate-distortion value among results for each prediction mode; and
encode the current block using the selected prediction mode and the one of the staircase-based transform or the sinusoidal-based transform, wherein the instructions to encode the current block comprise instructions to:
responsive to the size of a residual block generated using the selected prediction mode being above the minimum block size for a transform block, encode each sub-block of the plurality of non-overlapping sub-blocks formed of the residual block using a same one of the staircase-based transform or the sinusoidal-based transform; and
responsive to the size of the residual block generated using the selected prediction mode being the minimum block size for a transform block, encode the residual block using the one of the staircase-based transform or the sinusoidal-based transform.

7. The apparatus of claim 6 wherein the staircase-based transform is a Walsh-Hadamard transform and the sinusoidal-based transform is a Discrete Cosine transform.

8. The apparatus of claim 6 wherein the processor is configured to encode the current block by:
transforming, using the staircase-based transform, the residual block generated using the selected prediction mode; and
entropy coding the transformed residual block after quantizing the transformed residual block.

9. The apparatus of claim 6 wherein the sinusoidal-based transform is a two-dimensional (2D) sinusoidal-based transform and the staircase-based transform is one of a plurality of staircase-based transforms; and wherein the processor is configured to generate the second rate-distortion value by:
generating a respective second rate-distortion value for encoding the residual block using each staircase-based transform of the plurality of staircase-based transforms wherein the plurality of staircase-based transforms comprises:
a vertical one-dimensional (1D) staircase-based transform;
a horizontal one-dimensional (1D) staircase-based transform; and a 2D staircase-based transform.

10. The apparatus of claim 6 wherein the processor is configured to:
generate the first rate-distortion value by encoding the plurality of sub-blocks using the sinusoidal-based transform including quantizing transform coefficients of transform blocks generated by transforming the plurality of sub-blocks using the sinusoidal-based transform; and
generate the second rate-distortion value by encoding the plurality of sub-blocks using the staircase-based transform without quantizing transform coefficients of transform blocks generated by transforming the plurality of sub-blocks using the staircase-based transform.

11. The apparatus of claim 10 wherein the staircase-based transform is one of a Walsh-Hadamard transform or a Haar wavelet transform and the sinusoidal-based transform is one of a Discrete Cosine transform or an Asymmetric Discrete Sine transform.

12. The apparatus of claim 6 wherein the staircase-based transform is one of a Walsh-Hadamard transform or a Haar wavelet transform and the sinusoidal-based transform is one of a Discrete Cosine transfoIndrm or an Asymmetric Discrete Sine transform; and wherein the processor is configured to losslessly encode the current block by:
transforming the residual block using the one of the Walsh-Hadamard transform or the Haar wavelet transform to form a transform block and entropy coding the transform block without performing quantization on the transform block.

13. The apparatus of claim 6 wherein the non-baseband signal comprises one of a screencast or computer-generated animation.

* * * * *